D. L. DAVIDSON.
TRAP.
APPLICATION FILED MAR. 13, 1911.
1,025,055.
Patented Apr. 30, 1912.
2 SHEETS—SHEET 1.
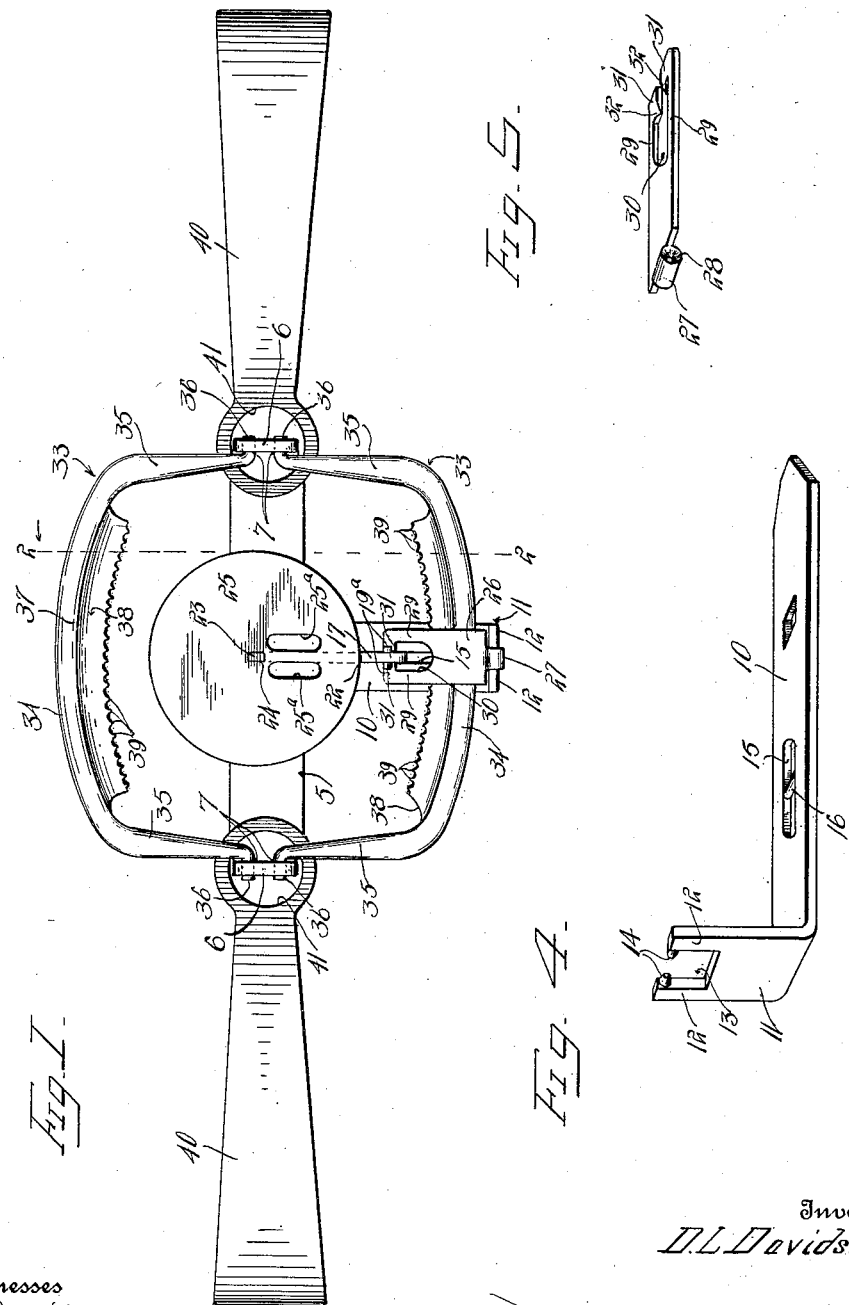
Inventor
D. L. Davidson D. L. DAVIDSON.
TRAP.
APPLICATION FILED MAR. 13, 1911.
1,025,055.
Patented Apr. 30, 1912.
2 SHEETS—SHEET 2.
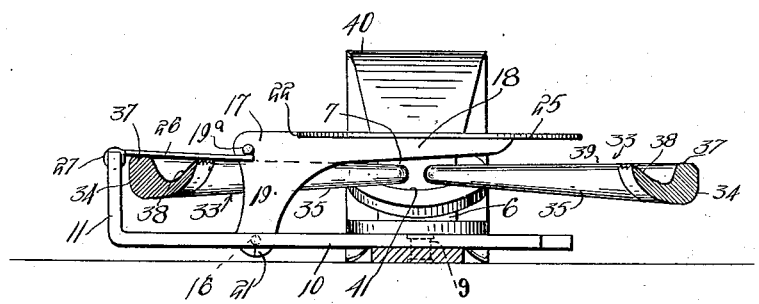
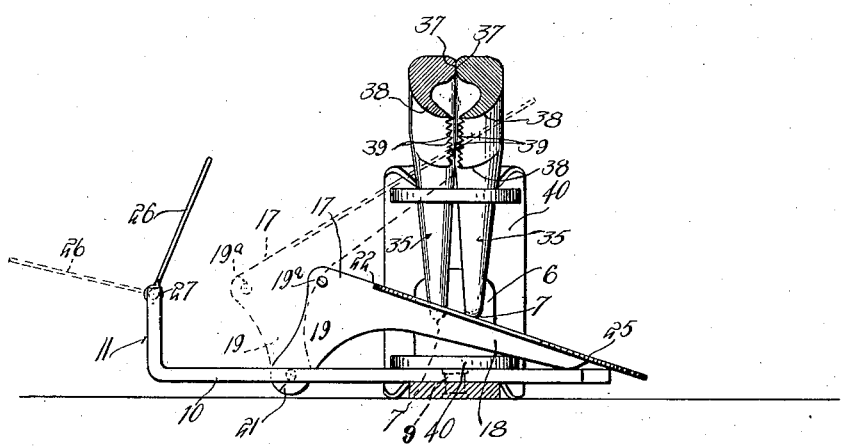
Witnesses
Inventor
D L Davidson
By
Attorneys

UNITED STATES PATENT OFFICE.

DAVID L. DAVIDSON, OF MILAM, TEXAS.

TRAP.

1,025,055.  Specification of Letters Patent. Patented Apr. 30, 1912.

Application filed March 13, 1911. Serial No. 614,087.

*To all whom it may concern:*

Be it known that I, DAVID L. DAVIDSON, a citizen of the United States, residing at Milam, in the county of Sabine, State of Texas, have invented certain new and useful Improvements in Traps; and I do hereby declare the following to be a full, clear, and exact description of the invention, such as will enable others skilled in the art to which it appertains to make and use the same.

This invention relates to an improvement in jaw traps of that type generally known as steel traps. It is a well known fact that in traps of this character the trigger mechanism is only released by a downward pressure upon the bait plate. As a result, the bait is oftentimes taken without the trap being sprung.

The principal object of this invention is to provide a trigger mechanism which is positively actuated upon movement either up or down of the bait plate.

Another object of the invention is to provide a pair of clamping jaws with teeth on their undersides, which are normally spaced apart, said teeth preventing the animals from pulling out of the trap.

A further object of the invention is to provide a trigger mechanism including a plate having means for securely fastening the bait thereon.

A still further object of the invention is to provide a trap of the class described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings: Figure 1 is a top plan view of the trap, showing the same in set position, Fig. 2 is a transverse sectional view taken on the line 2—2 of Fig. 1 in the direction indicated by the arrows, Fig. 3 is a similar view, but showing the trap in its inoperative position, Fig. 4 is a perspective view of the trigger supporting plate, and Fig. 5 is a perspective view of the latch.

Like reference numerals designate corresponding parts in all the figures of the drawings.

Referring to the drawings, 5 designates an elongated base-plate having ears 6—6 extending upwardly from each end and respectively provided with spaced openings 7—7. The base-plate is provided centrally with a preferably rectangular opening adapted to receive a corresponding shaped rivet 9, which rigidly connects a trigger supporting plate 10 to said base-plate. This plate 10 projects laterally at right angles from the base-plate, and is provided at its outer end with an upwardly projecting support 11. The upper end of this support is bifurcated to form spaced ears 12—12 and a consequent recess 13. Integral with and extending inwardly from either ear 12 are short trunnions 14—14. Formed in the plate 10 intermediate the support 11 and the base-plate 5, is an elongated and longitudinally disposed opening 15. Projecting centrally across this opening is a bearing-pin 16 which is preferably formed integral with the said plate 10.

The invention further comprises a trigger 17, which is preferably formed L-shaped in outline. This trigger consists of a body portion 18 and a foot 19. The lower end of the foot is provided with an opening adapted to be journaled upon the pin 16 of the plate 10. This foot 19 is preferably split as at 21, to permit of the foot being journaled upon said pin 16. The upper portion of the body 18 is recessed as indicated by 22, and projecting from the body portion at a central point in the recess is a rectangular lug 23, adapted to enter a corresponding opening 24 formed in the bait plate 25. Formed in the plate 25 on either side of the trigger 17 are elongated openings 25ª—25ª, by means of which bait can be securely fastened to the plate 25.

The invention further comprises a latch-pin 26, which is provided at one end with a centrally projecting bearing element 27. This bearing element is provided at its ends with seats 28—28 adapted to receive the trunnions 14. The latch-pin 26 is bifurcated at its other end to form spaced ears 29—29 and a consequent enlarged recess 30. Projecting inwardly from the ends of the ears are opposed feet 31—31. These feet are spaced a sufficient distance apart to receive the foot 19 of the trigger 17. The feet are furthermore adapted to be positioned below and directly against a projecting cross-pin 19ª which is carried by the foot 19. These feet are furthermore slanted as indicated by the numeral 32, to form a seat for the foot 19 of the trigger 17.

The invention further comprises a pair of clamp-jaws designated by the reference numerals 33—33. Each of these jaws is preferably of U-shaped construction, and consists of a connecting portion 34 and legs 35, the legs of each jaw being outwardly bent at their ends to form trunnions 36 which are respectively journaled in the openings 7 of the base-plate 5. The engaging faces 37 of the connecting portions 34 of the jaws are preferably rounded to prevent unnecessary cutting or injuring of an animal. Extending downwardly from the outer faces of the connecting portion 34 toward the trunnions 36 thereof, are inwardly curved longitudinal plates 38, which are respectively provided along their free edges with a series of teeth 39. It will be observed in this connection that by reason of the trunnions 36 being spaced apart the teeth 39 will be likewise spaced apart. The jaws 33 are normally retained in direct engagement by means of flat V-shaped springs 40—40, said springs being respectively provided with enlarged openings 41 at each end adapted to be positioned over the ears 6 of the base-plate. While two of these springs are shown, it will be obvious that only one can be employed if so desired.

From the foregoing, it will be observed that in order to set the trap, the jaws 33 are swung outwardly upon their trunnions 36 to a position shown in Fig. 1 of the drawings. As these jaws thus swing, the legs 35 contact with the ends of the springs 40 and these springs normally tend to return the jaws to their normal position, as will be readily observed. The bait is then secured to the plate 25 as before mentioned. It will be observed that one of the jaws is disposed between the support 11 and the trigger 17, and that the latch-pin is adapted to be disposed above said jaw. The feet 31 of the latch-pin are disposed under the cross-pin 19ª, and as a result, the tension of the springs 40 against the jaw 33 causes a pressure to be exerted upon the latch-pin 26 and consequently upon the trigger 17. As a result, the trigger 17 is retained in this latched relation until the pin 19ª is disengaged from the feet 31. In order to effect this release, pressure can be exerted either upwardly or downwardly upon the bait plate 25. When downward pressure is exerted upon said plate, the pin 19ª will be brought outwardly from the end of the latch-pin 26. Should however, an upward pressure be exerted upon said plate, the pin 19ª will be disposed within the enlarged recess 30 of the latch-pin. Immediately upon the release of the pin 19ª from the latch-pin, the springs 40 will cause the jaws to quickly close and thereby trap an animal.

What is claimed is:—

The combination in a trap of a base member having upturned apertured ends, jaws pivoted within said apertures, said jaws being provided with longitudinal grooves in their inner faces, rounded engaging surfaces and toothed engaging surfaces formed upon said jaw, springs located upon the upturned ends of the base member and engaging the jaws, a transversely extending plate secured to the base plate and having an upturned bifurcated end, lugs extending inwardly from said bifurcated end, a locking plate pivoted to the said lugs, said locking plate having a bifurcated end, inwardly extending ears formed upon the bifurcated end of the locking plate and being beveled outwardly, a trigger pivoted to the transverse plate and extending inwardly therefrom to overlie the base member, said trigger extending between the bifurcated ends of the locking plate, and a pin passing through said trigger and resting upon the beveled ears of the said locking plate as and for the purposes set forth.

In testimony whereof, I affix my signature, in presence of two witnesses.

DAVID L. DAVIDSON.

Witnesses:
 CLYDE S. NETHERY,
 C. A. NETHERY.